(12) United States Patent
Parulski

(10) Patent No.: US 6,915,273 B1
(45) Date of Patent: Jul. 5, 2005

(54) METHOD FOR PROVIDING CUSTOMIZED PHOTO PRODUCTS OVER A NETWORK USING IMAGES CAPTURED FROM A DIGITAL CAMERA

(75) Inventor: Kenneth A. Parulski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/576,288

(22) Filed: May 23, 2000

(51) Int. Cl.[7] .............................................. G06F 17/60
(52) U.S. Cl. ................................................... 705/26
(58) Field of Search ......................... 707/104; 705/25, 705/26

(56) References Cited

U.S. PATENT DOCUMENTS

| | | | |
|---|---|---|---|
| 5,666,215 A | * 9/1997 | Fredlund et al. | ............ 358/487 |
| 5,974,401 A | * 10/1999 | Enomoto et al. | ............. 705/40 |
| 6,004,061 A | 12/1999 | Manico et al. | |
| 6,173,992 B1 | * 1/2001 | Manico et al. | ................. 283/38 |
| 6,389,181 B2 | * 5/2002 | Shaffer et al. | ............... 382/305 |
| 6,537,927 B1 | * 3/2003 | Son | ............................ 438/771 |
| 6,636,648 B2 | * 10/2003 | Loui et al. | ................... 382/284 |

FOREIGN PATENT DOCUMENTS

WO  WO 00/69164  * 11/2000  ............. H04N/1/21

OTHER PUBLICATIONS

"Excite@Home: Excite's #1 webshots provides users with comprehensive photo capabilities; Unveilinh 'My Photos' where Excite users can create personal albums, share photos and order quality prints by Ofoto," M2 Presswire; Jun. 5, 2000.*

"Live Picture and Laboratoires Fujifilm France Debut New Consumer Services For Processing, Printing and Publishing Photos Online," PR Newswire; New York; Sep. 17, 1998.*

CompactFlash Specification Version 1.3, published by the CompactFlash Assocation, Palo Alto, California, Aug. 5, 1998.

* cited by examiner

*Primary Examiner*—Jeffrey A. Smith
*Assistant Examiner*—Matthew Gart
(74) *Attorney, Agent, or Firm*—Raymond L. Owens

(57) ABSTRACT

A method for providing customized digital printing services over a network to provide a photo product including images including providing an electronic database of information describing a plurality of photo product options that can be selected by a user via a digital communications network and displaying at a location remote from the electronic database the plurality of photo product options. The user provides a first group of digital images and selects at least one photo product from the plurality of digital printing service options and provides a payment identifier specifying a payment account to be debited to pay for the selected photo product, establishing a service account for the user containing an identifier for the selected photo product and storing the service account data which includes information related to the format of the photo product. The user prints the first group of digital images using the selected photo product option(s) and delivers the photo product to one or more designated recipients. The user subsequently provides a second group of digital images and a service account identifier, accessing the user service account data to identify the photo product option selected in step c. The user then prints the second group of digital images using the same photo product option used in step d) and delivers the photo product to one or more designated recipients.

17 Claims, 8 Drawing Sheets

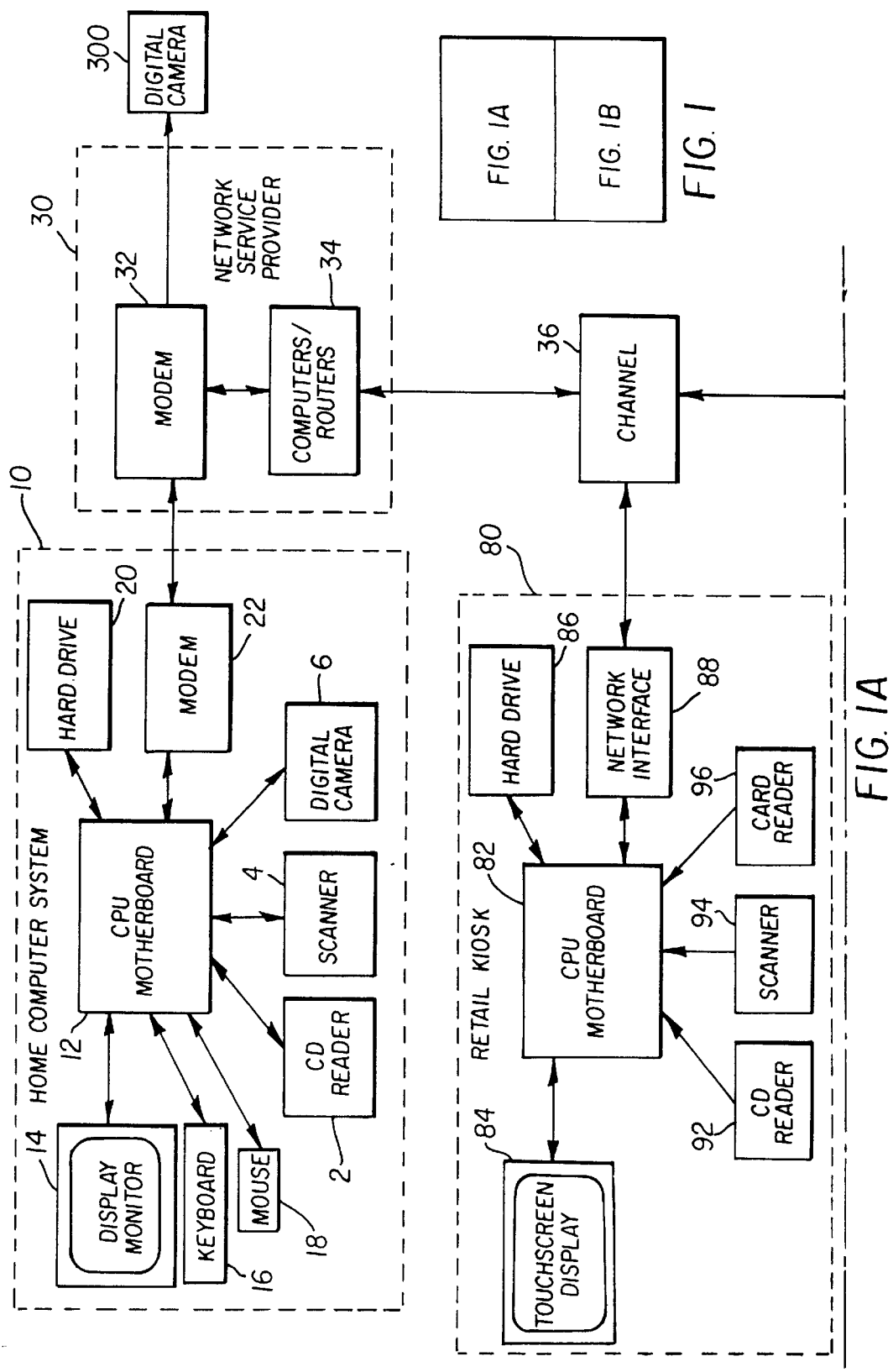

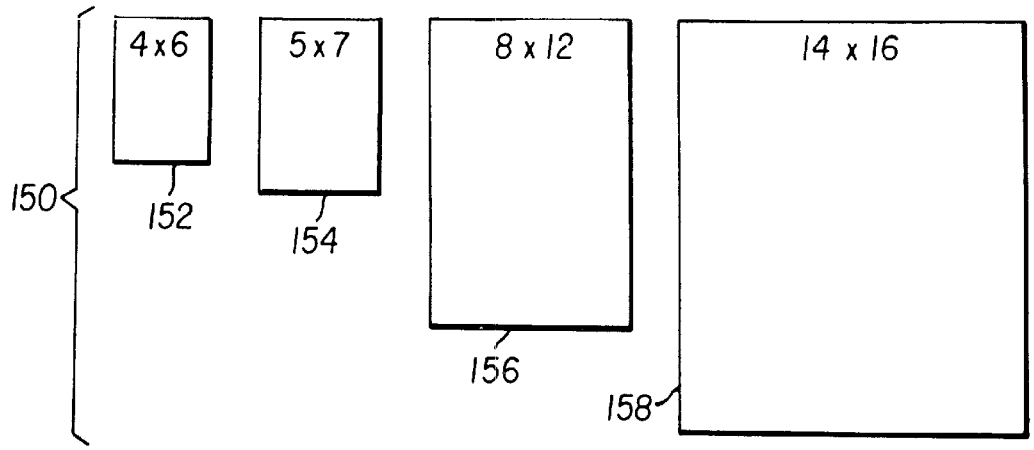
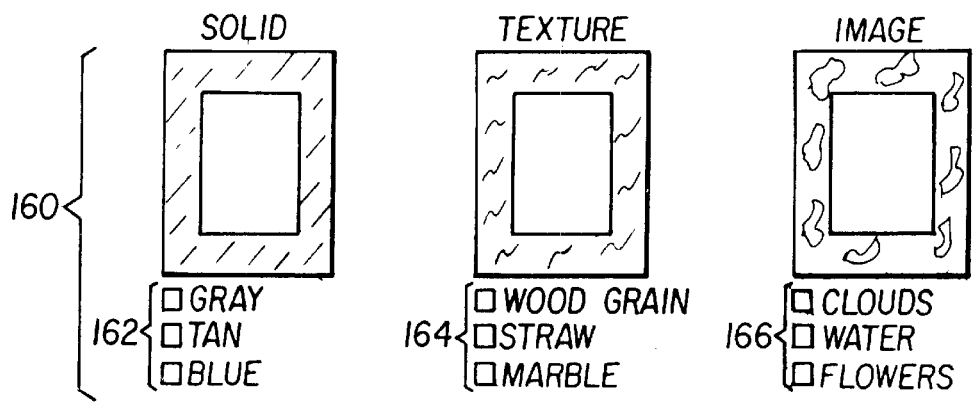
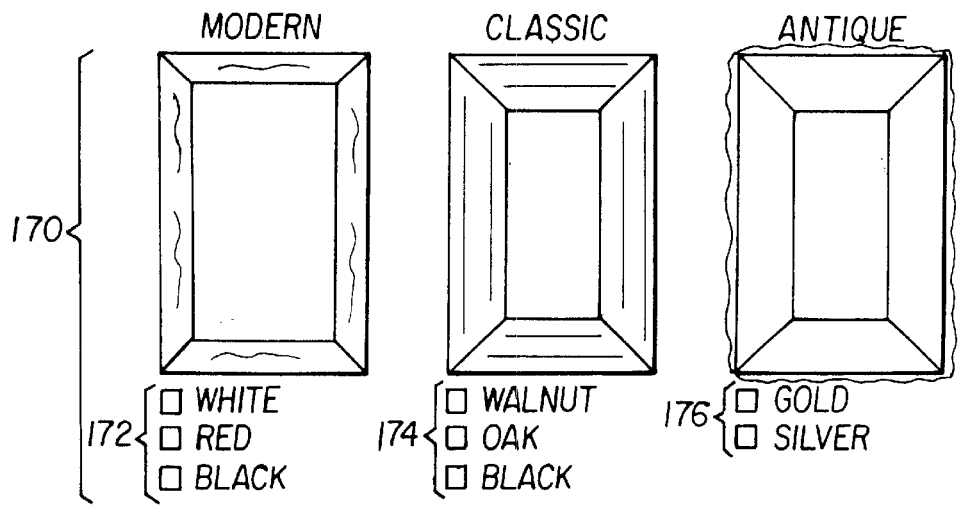
FIG. 3

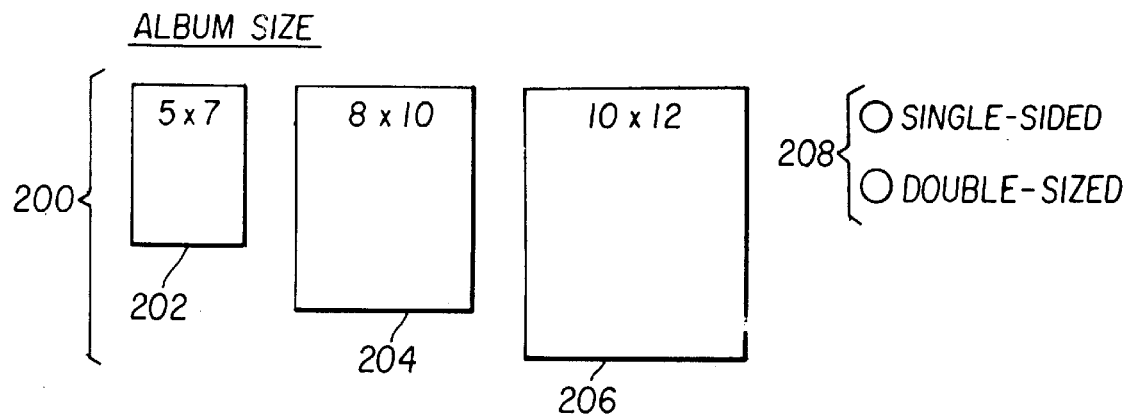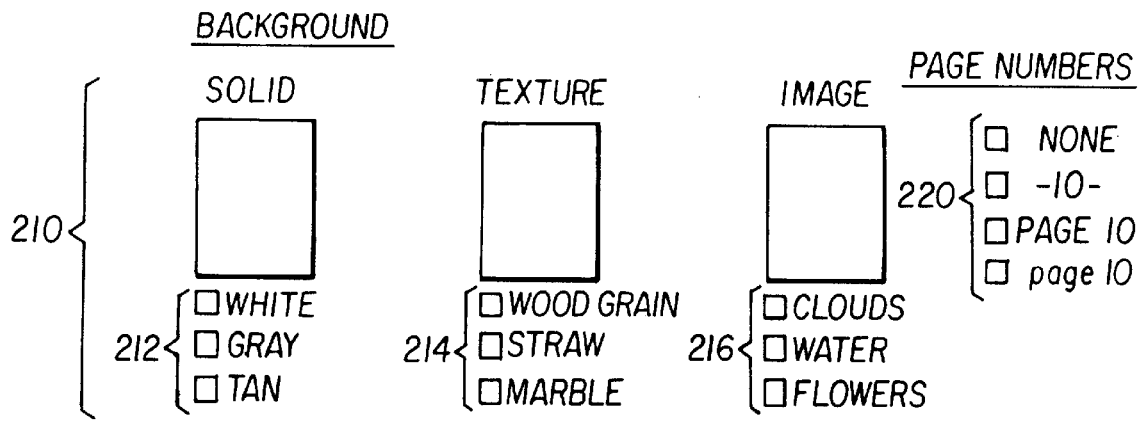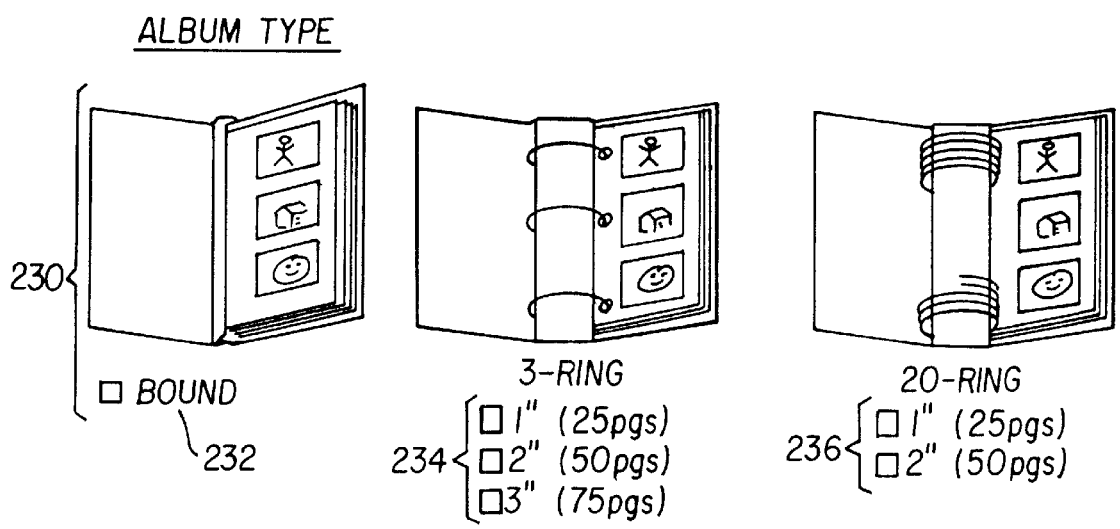
FIG. 4

```
 1
 2
 3    USER NAME
 4    PASSWORD
 5    USER E-MAIL ADDRESS
 6    USER SHIPPING ADDRESS
 7    BILLING INFORMATION
 8
 9    DESIGNEE #1 SHIPPING ADDRESS
10
11    DESIGNEE #2 SHIPPING ADDRESS
12
13    PRODUCT ID-1
14    PRODUCT TYPE: ALBUM
15        PAGE SIZE: 8 x 10
16        ALBUM TYPE: 3 RING PUNCH-2" THICK (50 PAGES)
17        BACKGROUND STYLE: #217-MARBLE
18        PAGE NUMBERS:
19            STYLE: -1-
20            FONT: HELEVETICA
21            COLOR: BLUE
22            LAST PAGE NUMBER: 17
23
24    PRODUCT ID-2
25    PRODUCT TYPE: FRAMED PRINT
26        FRAME SIZE: 14 x 16
27        FRAME STYLE: #175-CLASSIC-WALNUT
28        MATTE STYLE: #165-TEXTURE-WOODGRAIN
29
30    PRODUCT ID-3
31    PRODUCT TYPE: SERVICE PRINT
32        PRINT SIZE: 4 x 6
33        PRINT FINISH: GLOSSY
34        DATE STAMP: FRONT PRINT, LOWER LEFT, WHITE, 12 PT. HELVETICA
35
36
37
38
```

FIG. 5

METHOD FOR PROVIDING CUSTOMIZED PHOTO PRODUCTS OVER A NETWORK USING IMAGES CAPTURED FROM A DIGITAL CAMERA

CROSS REFERENCE TO RELATED APPLICATIONS

Reference is made to commonly assigned U.S. patent application Ser. No. 09/534,469, filed Mar. 24, 2000 (Pending), entitled "Configuring and Purchasing Imaging Devices" to Parulski.

FIELD OF THE INVENTION

The present invention relates to customizing photo products incorporating images and, more particularly, to using the Internet or other electronic network for providing customized photo products.

BACKGROUND OF THE INVENTION

Digital images, from digital cameras or scanned photographic film, can be uploaded to a web site for viewing, as described in commonly assigned U.S. Pat. No. 5,666,215 to Fredlund et al. Using a web browser, a group of these digital images can be viewed and selected for printing, for example using the Kodak Photonet Service. The user can select the size of each print to be produced, and the quantity of prints to be made from each image.

Album pages can be produced from digital images by arranging numerous images on the same page, as described in commonly assigned U.S. Pat. No. 6,004,061 to Manico et al. These album pages can be customized in terms of the size and arrangement of images on the page, the size and finish of the album pages, and the background color or patterns used.

Some web sites, such as the site provided by OFOTO, enable a user to upload a group of digital images for sharing with others over the internet and for providing digital printing services. This site permits a user to obtain an account using their e-mail address as the account name, and to provide a password and address information.

SUMMARY OF THE INVENTION

It is an object of the present invention to providing customized photo products over a network.

This object is achieved by a method for providing customized digital printing services over a network to provide a photo product including images, comprising the steps of:

a) providing an electronic database of information describing a plurality of photo product options that can be selected by a user via a digital communications network;

b) displaying at a location remote from the electronic database the plurality of photo product options;

c) the user providing a first group of digital images and selecting at least one photo product from the plurality of digital printing service options and providing a payment identifier specifying a payment account to be debited to pay for the selected photo product;

d) establishing a service account for the user containing an identifier for the selected photo product and storing the service account data which includes information related to the format of the photo product;

e) printing the first group of digital images using the selected photo product option(s) and delivering the photo product to one or more designated recipients;

f) the user subsequently providing a second group of digital images and a service account identifier;

g) accessing the user service account data to identify the photo product option selected in step c); and h) printing the second group of digital images using the same photo product option used in step d), and delivering the photo product to one or more designated recipients.

ADVANTAGES

It is an advantage of the present invention to provide a simplified method for obtaining digital printing services.

It is a further advantage of the present invention to provide a method for obtaining customized digital printing services using an internet accessible server for presenting information on service options, which allows a customer to select preferred service options.

It is a further advantage of the present invention to provide a method for obtaining customized digital printing services which stores the customer's preferred service options in a file that can be accessed at a later time, so that the user can easily obtain the same selected preferred service options at a later time, without needing to recall and re-select the preferred service options.

It is a further advantage of the present invention to provide a method for obtaining customized digital printing services which retains the customer's preferred service options so that the user can purchase, over a period of time, a series of customized photographic products that have the same appearance.

BRIEF DESCRIPTION OF THE DRAWINGS

FIG. 3 depicts a selection of print sizes, picture frame styles, and picture frame mattes provided by the system of FIG. 1;

FIG. 4 depicts an album page that can be provided by the system of FIG. 1;

FIG. 5 is a diagram depicting the service account information stored;

DETAILED DESCRIPTION OF THE INVENTION

Figure 1B:
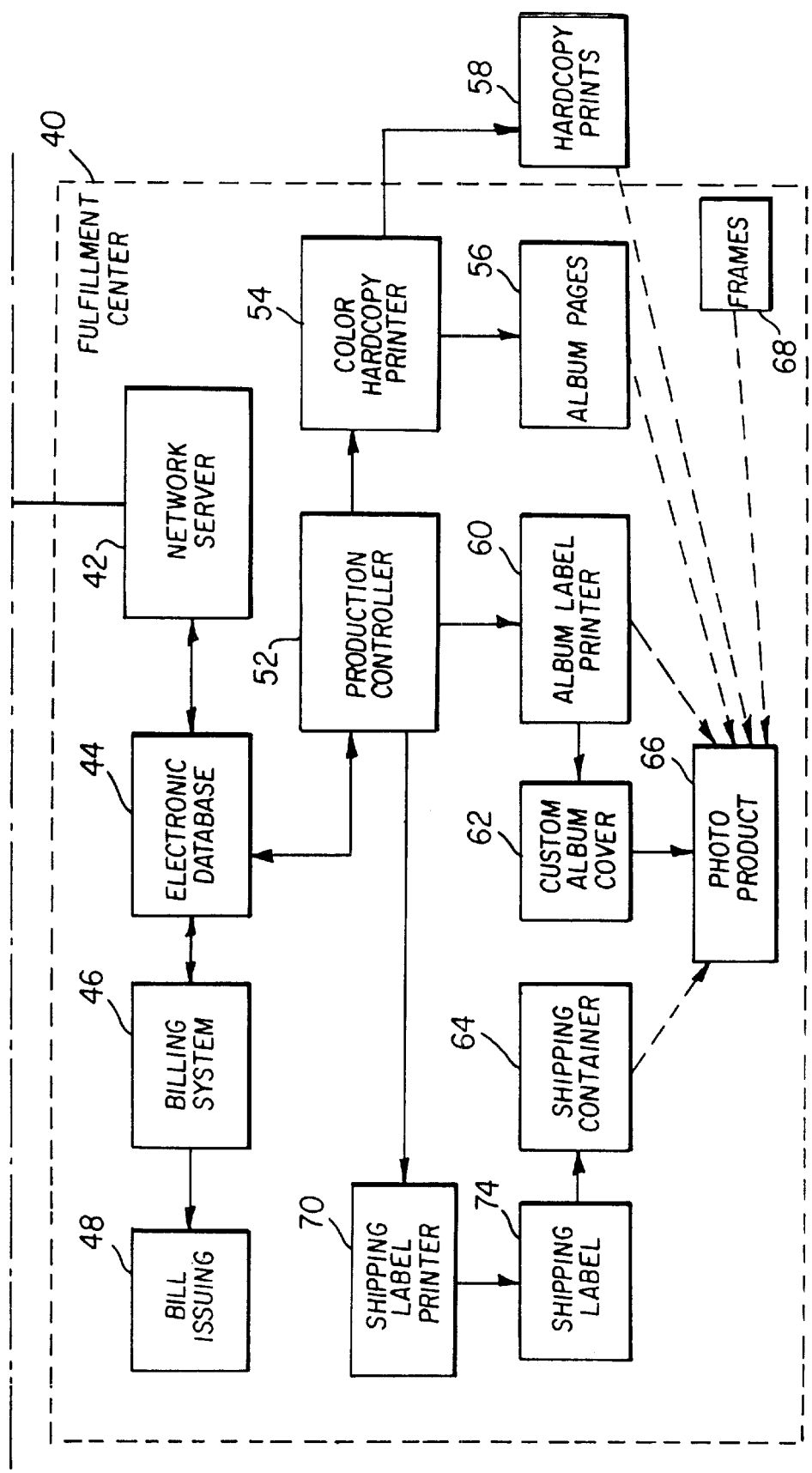
FIG. 1 depicts a block diagram of a system that implements this invention.

In accordance with the present invention, a method for providing customized photo products uses an Internet accessible server which accesses an electronic database and provides information on service options to a user at a remote location. The photo products can include standard print sizes and finishes, enlargements and frames, and complete album pages. These photo products can be customized to further include customized graphics, text, or image templates. The user establishes a service account and uploads a first group of digital images to be printed. The user selects the type of photo products that they prefer, and selects all of the options they prefer. This customer preference information is retained as part of the service account stored by the service provider, or using a special file on the user's computer accessible to the service provider. When the user subsequently accesses their account to upload a second group of digital images, this user service account data is recalled and can be used to providing matching photo products using the second group of digital images. In this way, the user can easily get the same type of digital prints, or other photo products, as in an earlier order, and does not need to remember and re-enter their choices to the numerous options. The user can access the digital printing service from their home PC via a modem, or from a retail kiosk.

The following discussion is for the situation where the user prefers to have images arranged and printed as album pages. On the user's first visit to the service provider web site, a user can select an album page size, an album cover, and preferred layout formats, background colors, patterns, and/or templates. The user then uploads the images to be printed and provides a payment identifier and shipping address. The images are then arranged on album pages, printed, inserted in the album (which can use a 3-ring binder) and then mailed to the customer. Many weeks or months later, the user returns to the same web site to upload and print an additional group of digital images. The service provider recognizes (through the use of a "cookie" or via an account number) that the user has previously ordered services, and accesses the stored account information for that user. The user is then presented with the option of printing the new images using the same album page size, finish, layout, etc. This permits the user to obtain album pages that match those previously purchased. The new pages are mailed to the user. The service provider also keeps track of the album capability and the number of pages used, to automatically print ascending page numbers and suggest that the user purchase a new album when the new album pages will exceed the capability of the user's present album.

In an alternate embodiment, the user decides to produce a number of framed images of a certain size, with a specific border matte color and type of picture frame. This information is stored as part of the user account. When the user returns at a later time to print additional images that will be displayed in the same way (e.g. that will be displayed alongside some of the originally printed images on the same wall of the user's family room, for example) information on the border matte color and type of picture frame is recalled from the user account, and the user is able to immediately order new photo products having the same size, matte color, and type of picture frame.

As shown in FIG. 1, the system includes a home computer system (with associated peripherals) 10 located at the customer location (e.g., their home). The system also includes equipment located at a network service provider 30, such as an internet service provider (ISP), which communicates with the home computer system 10 to provide a network connection for the customer to a channel 36, such as the Internet. The system also includes a retail kiosk 80 that communicates with the channel 36. The system further includes a fulfillment center 40 which communicates with the home computer system 10 and the retail kiosk 80 via the channel 36 and the network service provider 30 to perform the steps of selecting, configuring, purchasing, billing, and shipping a photo product 66. The fulfillment center 40 includes an electronic database 44, which is located remote from the computer 10 and the retail kiosk 80.

The various portions of the fulfillment center 40 can be located in a single building or complex of adjacent buildings, or can be geographically disbursed over several sites in different cities or even different continents. For example, the electronic database 44 and the production controller 52 can be provided by computers located in different cities and interconnected via a suitable digital communications network, such as the Internet. Furthermore, the electronic database 44 can itself be distributed over several computers in several different locations.

The home computer system 10, which can be, for example, a Dell Dimension XPS M200, includes a CPU motherboard 12, using, for example, a Pentium 200 MHz MMX processor as well as RAM memory. The CPU motherboard 12 executes software stored on a hard drive 20, for example, the well known Windows 98 operating system software and the Internet Explorer web browser software, both provided by Microsoft Corp. of Redmond, Wash. The CPU motherboard 12 is coupled to a display monitor 14 and a keyboard 16. A mouse 18 permits the customer to readily communicate with the CPU motherboard 12. The customer's computer 10 also includes a dial-in modem 22 for communicating with the network service provider 30 in order to connect to a channel 36, such as the Internet.

The CPU motherboard 12 communicates with a color scanner 4, such as a Microtek ScanMaker E6, which can scan color photographs (not shown) and store digital images of the photographs on the hard drive 20. The CPU motherboard 12 also communicates with a CD reader 2. The CD reader 2 can be used to input digital images from a CD-R disc, such as a Kodak PictureCD (not shown). The CPU motherboard 12 also communicates with a digital camera 6 via a suitable interface, such as the well known USB or RS-232 serial interfaces. The digital camera 6, for example a Kodak DC280 Zoom digital camera, can be used to provide digital images. The digital images provided by the CD reader 2, scanner 4, and digital camera 6 can be uploaded from the home computer system 10 to the fulfillment center 40 via network service provider 30 and channel 36.

The network service provider 30, for example, Earthlink Network, Inc. of Pasadena, Calif., includes banks of modems 32, one of which is connected to communicate with the modem 22 of the customer's computer 10. The modem 32 in turn communicates with computers/routers 34 in order to provide a connection to the channel 36 using equipment and techniques well known to those skilled in the art.

A retail kiosk 80 is located at a retail site, such as a photo specialty store in a shopping mall. The retail kiosk 80 includes a CPU motherboard 82, using, for example, a Pentium II 400 MHz processor as well as RAM memory. The CPU motherboard 82 executes software stored on a hard drive 86, for example, the well known Windows NT 4.0 operating system software provided by Microsoft Corp. of Redmond, Wash. The CPU motherboard 82 is coupled to a touchscreen display 84 which permits the customer to readily communicate with the CPU motherboard 82. The retail kiosk 80 also includes network interface 88 for communicating with the channel 36.

The CPU motherboard 82 communicates with a color scanner 94, which can scan color photographs (not shown) and store digital images of the photographs on the hard drive 86. The CPU motherboard 82 also communicates with a CD reader 92. The CD reader 92 can be used to input digital images from a CD-R disc, such as a Kodak PictureCD (not shown). The CPU motherboard 82 also communicates with a card reader 96 via a suitable interface, such as the well known USB or RS-422 parallel interfaces. The card reader 96 reads digital images from a memory card, such as a Compact Flash memory card used to record digital images in the Kodak DC280 Zoom digital camera. The digital images provided by the CD reader 92, scanner 94, and card reader 96 can be uploaded from the retail kiosk 80 to the fulfillment center 40 via channel 36.

Figure 6:
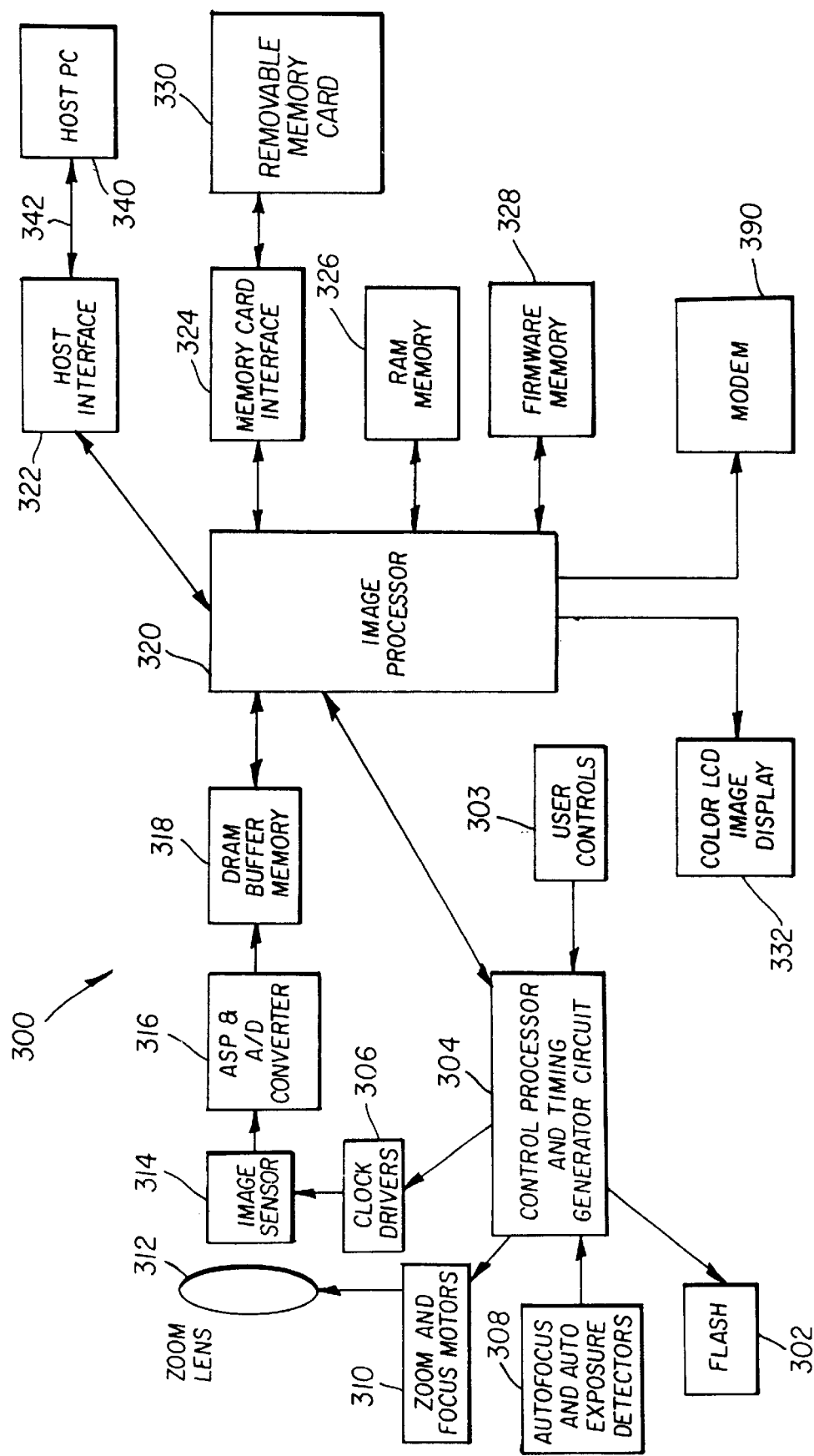
FIG. 6 depicts in more detail a digital camera shown as a block in FIG. 1 that is connected to a network service provider using a built-in modem.

Images can also be uploaded directly from a digital camera 300, which is shown in greater detail in FIG. 6.

The fulfillment center 40 is connected to the channel 36, such as the Internet, by a network server 42, such as an Internet server, which is comprised of one or more computers and associated peripherals. The electronic database 44 provides information describing numerous photo product options, including printing a group of digital images onto album pages. The electronic database 44 can be contained on the same computer as the network server 42, or can utilize a separate computer, or can be distributed over several computers at the same physical site, or at different sites.

The electronic database 44 includes information describing different features of the albums and other photo products 66 that can be selected and customized by the customer at the remote location, using the customer's computer 10 or retail kiosk 80. The electronic database 44 includes information describing photo product options, for example album features such as providing various background colors or textures, page numbers, page captions, image captions, etc. The album pages can be bound in a cover, or can include holes to permit the pages to be inserted into a standard binder, such as a three-ring binder. These album feature options can be demonstrated via software programs, for example, JAVA applets, MPEG or QuickTime movies, or Shockwave files, which depict the functionality of features that the customer can choose.

When a photo product 66 is purchased, the electronic database 44 communicates with a billing system 46 to verify that the payment identifier (e.g., credit card or debit card number) provided by the customer is valid, and to debit the account for the purchase. As shown in block 48, the bill is issued. The customer's account that is debited can, of course, be located at a remote financial institution. Typically, as with credit cards, this financial institution will make payment to the direct provider or seller of shippable photo product 66. This is generally done by wiring the amount into the direct provider's account, generally an account established with another financial institution.

As shown in FIG. 1, the electronic database 44 is connected to production controller 52. The production controller 52 controls one or more color hardcopy printers 54 which can produce album pages 56 or separate hardcopy prints 58. The hardcopy prints can be placed in frames 68. The production controller 52 is also connected to an album label printer 60 which produces labels that can be attached to a standard album cover to provide custom album cover 62.

The production controller 52 also controls a shipping label printer 70 to produce a shipping label 74. The shipping label 74 is attached to a shipping container 64 (e.g., a cardboard box containing packing material) that contains and protects the photo product 66 during shipment (e.g., via air express mail, ground carrier, etc.) to the customer or the customer's designee.

Figure 2:
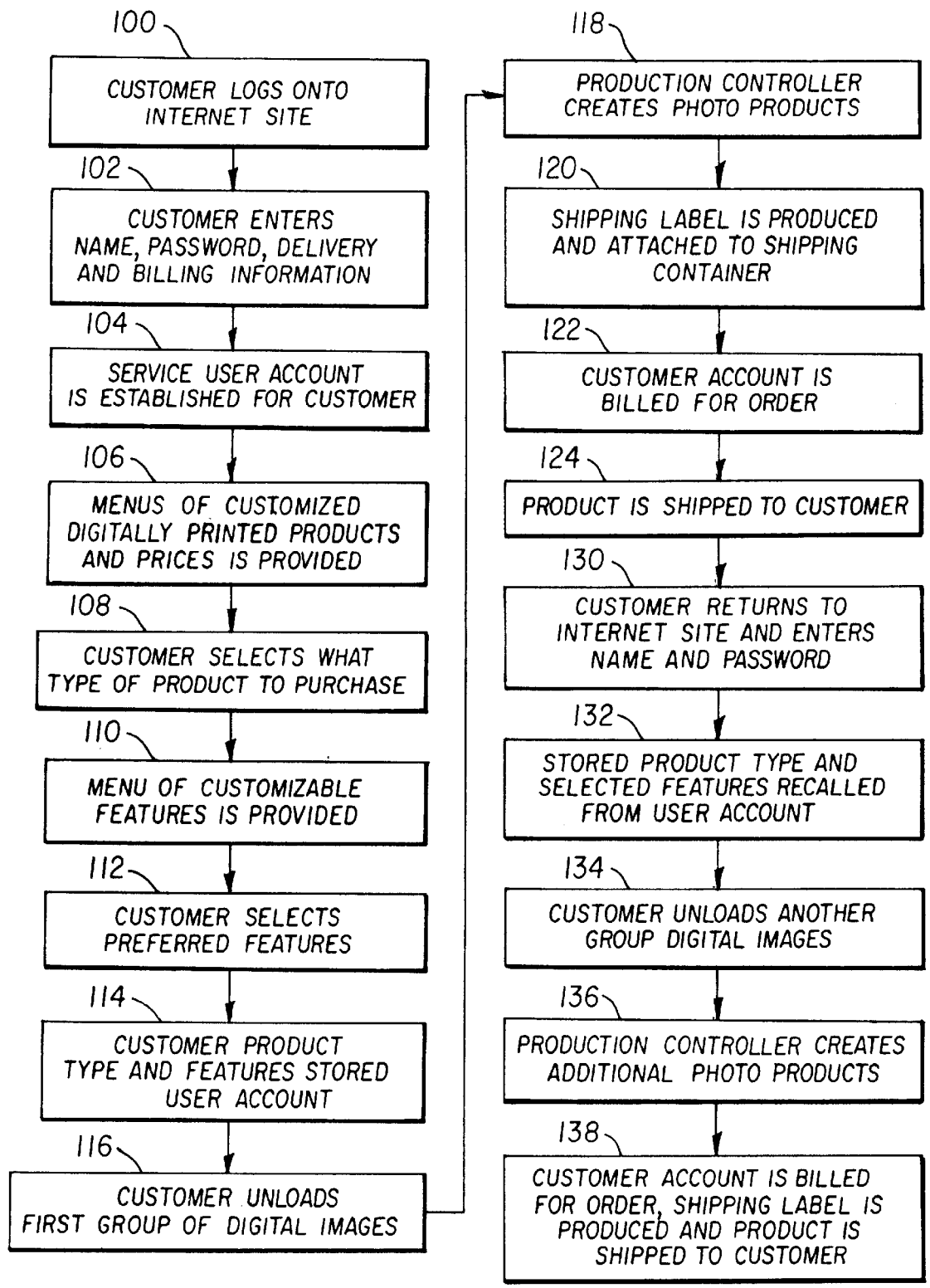
FIG. 2 is a flow diagram of a typical transaction for providing customized photo products over a network.

Turning now to FIG. 2, there is shown a flow diagram of a typical purchase transaction for providing personalized digital imaging products. As shown in block 100, the customer, using a digital communication network, logs onto the channel 36, which can be the Internet. The customer can, of course, use a service provider, such as the network service provider 30, to gain access to the channel 36. The network service provider 30 uses an address, such as an Internet protocol (IP) address, to establish a connection between the customer's computer 10 and a product provider or seller which owns or controls the fulfillment center 40. The customer can also use retail kiosk 80 to obtain access to the fulfillment center 40.

In block 102, the customer enters their name, selects a password, and provides delivery and billing information. This information identifies the customer and the customer's designee (e.g. the person to whom the photo product 66 should be shipped, which can of course be the customer). It includes addresses of both the customer and one or more of the customer's designees. The customer also identifies an account to be debited to pay for the photo product(s) to be purchased. Often this will be a credit card having a payment identifier that specifies the account of the customer to be charged or debited. Frequently, this will be in a financial institution. The payment identifier can be a credit card number that specifies a particular credit card account. As used in this specification, a credit card will also include a debit card.

In block 104, a user service account is established for the customer. This service account includes the information entered by the customer in block 102, which will later be augmented by additional information listing the photo product options selected by the customer. FIG. 5 provides an example of the service account information. The billing information (e.g. credit card number) and other sensitive information provided in the service account can be encrypted to prevent discovery and unauthorized use.

In block 106, the fulfillment center 40 provides the customer with a menu of photo products 66 that are available for customization and purchase, such as standard service prints, framed hardcopy prints as depicted in FIG. 3, and customized photo albums as depicted in FIG. 4. In block 108 the customer selects what type of products (e.g. standard service prints, framed hardcopy prints, or customized photo albums) to purchase.

In block 110, the network server 42 provides a menu of customizable features for the type of product selected by the user. This menu is displayed on display monitor 14 if the user is located at the home computer system 10, or on touchscreen display 84 if the user is located at retail kiosk 80. In block 112, the customer selects preferred features for the product type they selected in block 108.

The options for standard prints include providing the prints in various sizes (e.g. 3"×5", 4"×6", etc.) and various surface finishes (e.g. glossy, matte finish, etc.). The standard prints can also include text, such as the date the picture was captured or printed. The date the pictures were captured can be obtained from the digital image file to be uploaded, if the picture was taken by a digital camera or by an APS film camera having a real-time clock. The user can select whether or not to include this date stamp, where to position the text (e.g. on the front at the lower left, or on the back of the print.). The user can also select the color (e.g. white or yellow) and the font (e.g. Helvetica or Script) for the date stamp. The user can alternately enter a text message (e.g. "Photos by Ray" or "Copyright 2000 by Pam") or graphic to overlay a specified area of the images to be printed.

FIG. 3 depicts framed options that can be selected by the user. The options include selecting the size of the print from a plurality of print sizes 150, including 4"×6" size 152, 5"×7" size 154, 8"×10" size 156, and 14"×16" size 158. The user selects the size by selecting the appropriate print size icon (e.g. icon 152, 14, 156, or 158). The options also include selecting a matte style from a plurality of styles 160, including solid mattes 162 in gray, tan, and blue, textured mattes 164 in woodgrain, straw, or marble, and background image mattes 166 including clouds, water, or flowers. The user selects the matte by selecting the appropriate radio button (e.g. one of buttons 162, 164, or 166) for their preferred matte style. The user then selects a picture frame style from a variety of styles 170, including modern styles 172 in white, red, and black, classic styles 174 in walnut, oak, and black, and antique styles 176 in gold and silver. The user selects the picture frame style by selecting the appropriate radio button (e.g. one of buttons 172, 174, or 176) for their preferred frame style. Of course, many more size, matte, and frame options can be presented to the user using various types displays, such as pull-down menus, scroll bars, etc. The selected combination of print size, matte style and frame style is then presented to the user. For example, if the user selects a classic walnut frame with a texture wood grain matte, the internet server 42 would present to the user an image depicting this combination for the user to review.

FIG. 4 depicts album options that can be selected by the user. The options include selecting the size of the album from a plurality of sizes 200, including 5"×7" size 202, 8"×10" size 204, and 10"×12" size 206. The user selects the size by selecting the appropriate print size icon (e.g. icon 202, 204, or 206). The options also include using radio buttons 208 to select single-sided pages (e.g. print only on 1 side of the album page) or double-sided pages. The options further include selecting a preferred background style from a plurality of styles 210, including solid backgrounds 212 in white, gray, or tan, textured backgrounds 214 in wood grain, straw, or marble, and background images 216 including clouds, water, or flowers. The user selects the background style by selecting the appropriate radio button (e.g. one of buttons 212, 214, or 216). The user then selects whether to include a page number from a plurality of options using radio buttons 220. The options include no page numbers and several different styles of page numbers. The color, size, and font of the text used for the page numbers and image captions could also be selected using a separate menu (not shown). Finally, the user selects an album type from a plurality of album types 230. The album type is selected by the user by selecting one of the radio buttons for bound albums 232, 3-ring albums 234 (including 1", 2", and 3" thick 3-ring albums) or 20-ring albums 236 (including 1" and 2" thick albums). Of course, many more size, background, and album type options can be presented to the user using various types displays, such as pull-down menus, scroll bars, etc. The selected combination of album size, background, page numbers, and album type is then presented to the user. For example, if the user selects a 8"×10" double-sided album pages in a 3-ring, 2" thick binder with a marble texture background and a particular page number style, the internet server 42 presents to the user an image depicting this combination for the user to review.

In step 114, the customer's selected photo product options are added to the user's service account information. As depicted in FIG. 5, the service account information can include information for several products having different identifiers (ID) such as Product ID-1 (lines 13–22) which specifies a customized album, Product ID-2 (lines 24–28) which specifies a framed print, and Product ID-3 (lines 30–34) which specifies customized service prints. The album related information (lines 13–22) includes the page size, album type, and background style selected. It also includes page number information, such as the style, font, and color of the text, and the last page number printed. The last page number information is updated each time new album pages are printed. It can be used to automatically tell the user when an album has been filled, and a new album needs to be purchased. The framed print information (lines 24–28) specifies the frame size, frame style and color, and matte style. The service print information (lines 30–34) specifies the print size, print finish, and the location, font style, size, and color of the date to be overlaid in the print. The service print information could also specify other text or graphics selected by the user that should be added to the images when they are printed. The service print information is stored in electronic database 44. Alternatively, the service print information could be stored on hard drive 20 of home computer system 10 or hard drive 86 of retail kiosk 80.

In block 116, the customer uploads a first digital image, or group of digital images, from the home computer system 10 or retail kiosk 80. This can be done by selecting to upload all the images from a particular CD inserted in CD reader 2 or CD reader 92, or stored in digital camera 6 or card reader 96, or by individually selecting images to be uploaded. Alternatively, the customer can specify a web address or Internet account containing the images to be uploaded, if the images have previously been uploaded either by the user or by a service provider, such as the Kodak PhotoNet service which scans film negatives and uploads the images to a web site accessible by the customer.

In block 118, the production controller 52 produces the customized photo products using the uploaded images and the service print information stored in electronic database 44. If the user has ordered an album, the uploaded digital images can be automatically arranged on the pages and printed by color hardcopy printer 54 to produce album pages 56 as described in commonly assigned U.S. patent application Ser. No. 09/347,310 (U.S. Pat. No. 6,636,648), filed Jul. 2, 1999 to Loui et al.; U.S. patent application Ser. No. 09/199,724 (PENDING), filed Nov. 25, 1998 to Shaffer et al; and Ser. No. 09/199,639 (U.S. Pat. No. 6,389,181), filed Nov. 25, 1998 to Shaffer et al., the disclosures of which are herein incorporated by reference. Alternatively, the user can manually arrange the images on the pages. The last page number (line 22) in the service account information depicted in FIG. 5 is updated to reflect the number of album pages that will be produced to show the uploaded images. The user can also select preferred colors, messages, logos, or images for the custom album cover 62.

At this point, the can be presented with one or more display screens showing the final products to be delivered, and confirming the cost of the products. The user can then approve the order and log off of the Internet site.

If the user has ordered framed prints, the digital image is printed using color hardcopy printer 54 to produce hardcopy print 58. The hardcopy print 58 includes the user selected matte border, for example the texture—wood grain border specified in line 28 of FIG. 5. The hardcopy print 58 is then framed using the appropriate frame 68, for example the classic—walnut frame specified in line 27 of FIG. 5. If the user has ordered service prints, the digital images are printed using color hardcopy printer 54 to produce hardcopy prints 58. The hardcopy prints 58 use the size and finish specified in lines 32–33 of FIG. 5. Before printing, the digital image is overlaid with the date stamp as specified in line 34 of FIG. 5.

In block 120, the production controller 52 in FIG. 1 controls the shipping label printer 70 to produce the shipping label 74 using the shipping address of the customer or customer's designee provided in the service account information (FIG. 5). The shipping label 74 is attached to the shipping container 64 which is used to ship the photo product 66.

In block 122, the customer account provided in the service account information (FIG. 5) is billed for the order. At this point, the financial institution having the customer's account designates such funds for transfer to the product provider or seller.

In block 124, the photo product 66 incorporating the first group of digital images is delivered to the customer or the customer's designee. The term "delivery" means that the photo product 66 can be shipped to the customer or the customer's designee by the U.S. Postal Service (USPS) or by a carrier service, such as the United Parcel Service (UPS) or Federal Express. Alternatively, the photo product 66 can be delivered to a location such as the store where the retail kiosk 80 is located, where the customer can pick it up. In this case, the billing provided in step 122 can be delayed until the customer picks up the photo product 66, and the customer can then pay for the photo product 66 using cash, check, or a charge/debit card.

After the photo products are shipped to the user in block 124, the first set of digital images uploaded by the user in step 116 can be deleted from electronic database 44 in FIG. 1. The service account information in FIG. 5 is retained, however, so that it can be used for subsequent orders by the same customer.

Block 130 typically occurs many weeks or months later. At this time, the customer returns to the home computer system 10 or retail kiosk 80 with additional digital images to be printed. In block 130, the customer again logs onto the internet site and enters their name and password, similar to block 100. Alternately, the home computer system 10 can include a "cookie" created and stored on hard drive 20 when the user first accessed the internet site in step 100. This "cookie" can automatically identify the user account.

In block 132 the network server 42 accesses, from the electronic database 44 in FIG. 1, the service account information for the customer. The network server 42 provides a display for the user based on the Product ID information stored in the user's service account. For example, if the user had selected a classic walnut frame with a texture wood grain matte in step 112, the internet server 42 would present to the user an image depicting this combination for the user to review. If the user had also selected a 8"×10" double-sided album pages in a 3-ring, 2" thick binder with a marble texture background and a selected page number style in step 112, the internet server 42 would also present to the user an image depicting this combination for the user to review. These images are displayed on display monitor 14 if the user is located at the home computer system 10, or on touch-screen display 84 if the user is located at retail kiosk 80. The network server 42 also allows the user to select new types of products to purchase, and to customize the products, as provided earlier in blocks 106 to 114.

In block 134, the customer uploads a second digital image, or group of digital images, from the home computer system 10 or retail kiosk 80. As in block 116, this can be done by selecting to upload all the images from a particular CD inserted in CD reader 2 or CD reader 92, or stored in digital camera 6 or card reader 96, or by individually selecting images to be uploaded. Alternatively, the customer can specify a web address or Internet account containing the images to be uploaded, if the images have previously been uploaded either by the user or by a service provider, such as the Kodak PhotoNet service which scans film negatives and uploads the images to a web site accessible by the customer.

In block 136, the production controller creates additional photo products, as described earlier in relation to block 118.

The production controller 52 produces the customized photo products using the second group of images uploaded in step 134 and the service print information stored in electronic database 44. If the user has ordered an album, the last page number (line 22) in the service account information depicted in FIG. 5 is updated to reflect the number of album pages that will be produced to show the uploaded images. If the number of new album pages to be produced will exceed the capacity of the customer's current album (e.g. if the print count will be 54, which is more than 50 pages for the 2" thick binder in FIG. 4), the user is automatically advised that a new album will be ordered to store some of the new album pages, and the page numbers printed on the album pages are number accordingly. In the above example, the last 4 pages (e.g. prints 51 to 54) are given page numbers 1 to 4 and provided in a new album, while the other pages will be included in the earlier 3-ring album provided as part of the earlier order.

At this point, the customer can be presented with one or more display screens showing the final products to be delivered, and confirming the cost of the products. The user may then approve the order and log off of the Internet site.

In step 138, the shipping label 74 is produced and attached to the shipping container 64, the customer account is billed for the order, a the photo product(s) incorporating the second group of images are shipped to the customer or customer's designee, as described earlier in relation to blocks 120 to 124.

The user can of course repeat steps 130 to 138 many times, with new groups of digital images, to simply and easily obtain similarly customized photo products. For example, the user can, over the course of several years, obtain a set of frame prints having similar frame styles and matte colors, without needing to re-enter, or even remember, the choices they had made for their earlier orders.

FIG. 6 is a block diagram showing the electronic camera 300 in more detail, which includes a modem 390 to communicate with the network service provider 30 depicted in FIG. 1. The electronic camera 300 produces digital images that are stored on the removable memory card 330. The electronic camera 300 includes a zoom lens 312 having zoom and focus motor drives 310 and an adjustable aperture and shutter (not shown). The zoom lens 312 focuses light from a scene (not shown) on an image sensor 314, for example, a single-chip color CCD image sensor, using the well known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory.

The processed digital image file is provided to a memory card interface 324 which stores the digital image file on the removable memory card 330. Removable memory cards 330 are known to those skilled in the art. For example, the removable memory card 330 can include memory cards adapted to the *CompactFlash Specification Version* 1.3, published by the CompactFlash Association, Palo Alto, Calif., Aug. 5, 1998. Other types of digital memory devices, such as magnetic hard drives, magnetic tape, or optical disks, could alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The processor 320 also creates a "thumbnail" size image that is stored in RAM memory 326 and supplied to the color LCD image display 332, which displays the captured image for the user to review. The electronic camera 300 is controlled by user controls 303, such as a series of user buttons including a shutter release (e.g., capture button) (not shown) which initiates a picture taking operation. The graphical user interface displayed on the color LCD image display 332 is controlled by the user interface portion of the firmware stored in the firmware memory 328.

After a series of images have been taken and stored on the removable memory card 330, the removable memory card 330 can be inserted into the card reader 96 in retail kiosk 80. Alternatively, an interface cable 342 from Host PC 340 can be used to connect between the host interface 322 in the electronic camera 300 and the CPU motherboard 12 in home computer system 10. The interface cable 342 can conform to, for example, the well known universal serial bus (USB) interface specification.

The camera 300 can transmit images to the network service provider 30 using the modem 390, as described in commonly assigned U.S. patent application Ser. No. 09/004,046 (PENDING), filed Jan. 7, 1998 to Ward et al., the disclosure of which is herein incorporated by reference. The camera 300 can also create and transmit a utilization file listing the images to be printed, as described in commonly assigned U.S. patent application Ser. No. 08/977,382 (U.S. Pat. No. 6,573,927), filed Nov. 24, 1997 to Parulski et al., the disclosure of which is herein incorporated by reference. The camera can store a service account identifier in the firmware memory 328, as described in commonly assigned U.S. patent application Ser. No. 09/534,469 (PENDING), filed Mar. 24, 2000 to Parulski, the disclosure of which is herein incorporated by reference. The service identification number can then be stored onto the removable flash memory 330, either as part of each image file, or as a separate digital record, so that it can be used to automatically access the service account for the user to determine what services should be provided.

Figure 7:
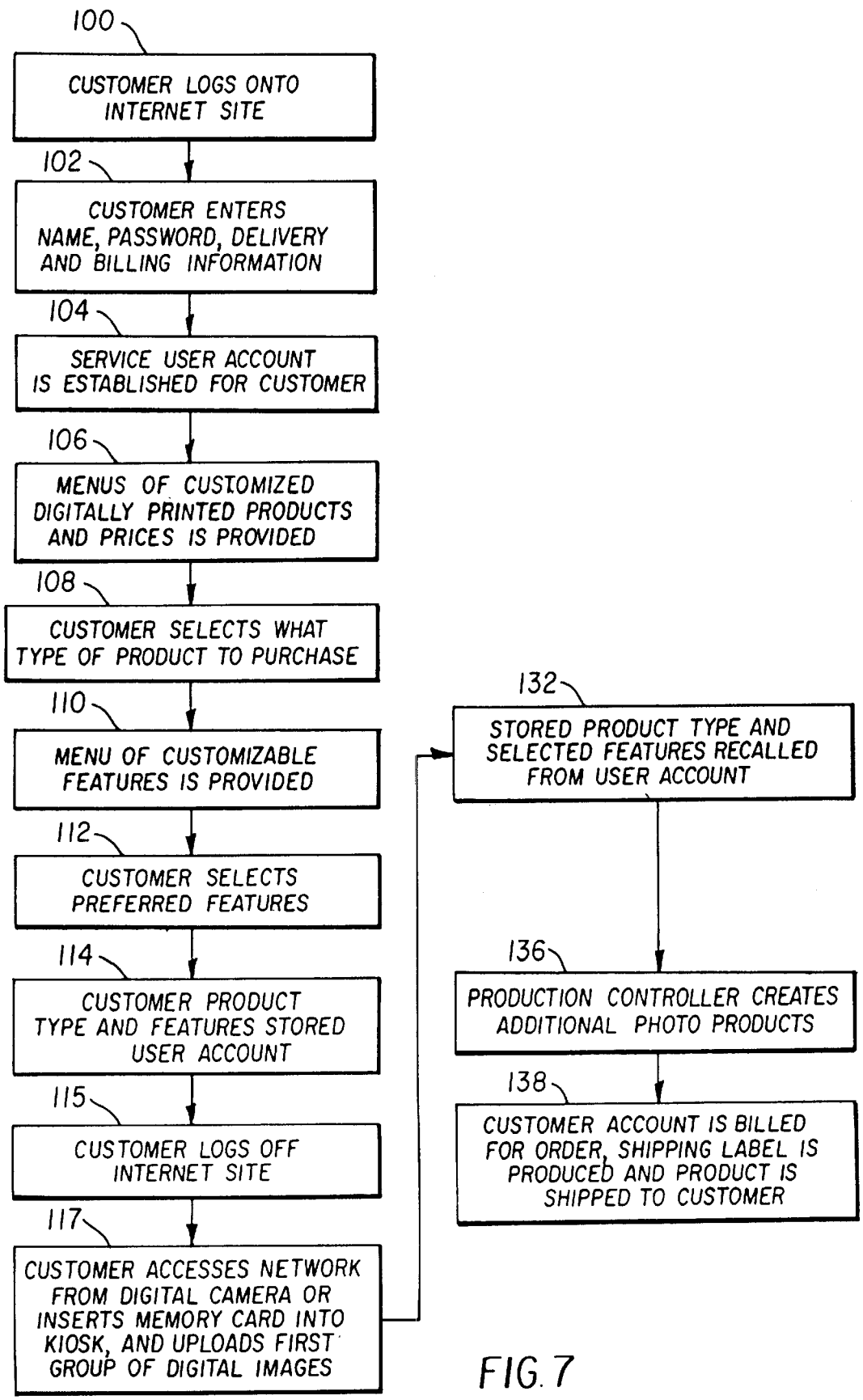
FIG. 7 is a flow diagram of a typical transaction for printing images uploaded from the digital camera of FIG. 6.

FIG. 7 is a flow diagram of a typical transaction for printing images uploaded from the digital camera of FIG. 6. FIG. 7 is similar to FIG. 2 except that block 116 of FIG. 2 has been replaced by blocks 115 and 117. Blocks 118–131 of FIG. 2 have been deleted in FIG. 7, and block 134 of FIG. 2 has been also been deleted.

Where the blocks carry the same reference numerals, they have the same functions. In blocks 100–114 of FIG. 7, a customer logs onto an internet site, a service account is established for the customer, the customer selects the type of product to purchase, and selects preferred features, which are stored in the user account. In block 115, the customer logs off the internet site without having uploaded any digital images. The customer then uses digital camera 300 to capture digital images which are stored on removable memory card 330. In block 117, the customer connects via modem 390 in FIG. 6 to network service provider 30 shown in FIG. 1. The customer uploads the first group of digital images from removable memory card 330 to fulfillment center 40 via channel 36, which can be the internet. Alternatively, the customer takes the removable memory card 330 to retail kiosk 80 and inserts it in card reader 96. The first group of digital images is then uploaded from retail kiosk 80 to the fulfillment center 40 via channel 36.

The customer's service account identifier is also transferred along with the first group of digital images.

In block 132 the network server 42 accesses, from the electronic database 44 in FIG. 1, the service account information for the customer. For example, if the user selects and customizes an album in blocks 106–114 of FIG. 7, the service account information specifying this customized album (e.g. lines 14–22 in FIG. 5) is recalled from the user account. In block 136, the production controller 52 creates photo products using digital images uploaded from the digital camera 300 in step 117. In block 138, the customer account is billed for the order, and the product is shipped to the customer. Steps 117–138 in FIG. 7. can be repeated each time the customer takes a new group of digital images. Using the method of FIG. 7, the fulfillment center 40 can create album pages using the uploaded digital images and stored user account information.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST

2 CD reader
4 color scanner
6 digital camera
10 home computer system
12 CPU motherboard
14 display monitor
16 keyboard
18 mouse
20 hard drive
22 dial-in modem
24 color scanner
30 network service provider
32 modem
34 computers/routers
36 channel
40 fulfillment center
42 network server
44 electronic database
46 billing system
48 bill issuing
50 product configuration system
52 production controller
54 color hardcopy printers
56 album pages
58 hardcopy prints
60 album label printer
62 custom album cover
64 shipping container
66 photo product 68 frames
70 shipping label printer
72 shipping label printer
74 shipping label
80 kiosk
82 CPU motherboard
84 touchscreen display
86 hard drive
88 network interface
92 CD reader
94 color scanner
96 card reader
100 block
102 block
104 block
106 block
108 block
100 block
110 block
112 block
114 block
115 block
116 block
117 block
118 block
120 block
122 block
124 block
130 block
132 block
134 block
136 block
138 block
150 print sizes
152 print size
154 print size
156 print size
158 print size
160 matte styles
162 solid mattes
164 textured mattes
166 background image mattes
170 picture frame styles
172 modern picture frame style
174 classic picture frame style
176 antique picture frame style
202 album size
204 album size
206 album size
208 radio buttons
210 background style
212 solid background style
214 textured backgrounds
216 background images
220 radio button
230 album types
232 bound albums
234 3-ring albums
236 20-ring albums
300 digital/electronic camera
302 flash
303 users controls
304 control processor and timing generator circuit
306 clock drivers
308 autofocus and autoexposure detectors
310 zoom and focus motor drives
312 zoom lens
314 image sensor
316 analog signal processing and analog-to-digital converter circuit
318 DRAM buffer memory
320 processor
322 host interface
324 memory card interface
326 RAM memory
328 firmware memory
330 removable memory card
332 color LCD image display
340 Host PC
342 interface cable
390 modem

What is claimed is:

1. A method for providing customized digital printing services over a network using images from a digital camera, comprising the steps of:

a) a service provider providing an electronic database of information describing a plurality of printing options that can be selected by a user operating a first computer at a location remote from the service provider which has logged onto a digital communications network;

b) displaying on a display of the first computer at the remote location the plurality of printing options and the user selecting a printing option;

c) establishing a service account including a service account identifier and data identifying the selected printing option and the service provider storing the service account identifier and data identifying the selected printing option and the user logging off the digital communication network;

d) capturing, using a digital camera, one or more digital images and using a modem in the digital camera to send the one or more captured digital images and the service account identifier to the service provider over the digital communication network without using the first computer;

e) the service provider using the service account identifier to identify the printing option selected in step c); and f) the service provider using the at least one or more digital images using the selected printing option from the accessed service account to produce prints.

2. The method of claim 1 further including the step of delivering the prints to indicated locations of one or more designated recipients.

3. The method of claim 2 wherein step c) further includes providing addresses of designated recipients.

4. The method of claim 1 wherein one of the printing options provides album pages.

5. The method of claim 4 further including providing the album pages in different sizes.

6. The method of claim 4 further including providing the album pages in different print layout formats.

7. The method of claim 4 further including providing the album pages in different background colors or patterns.

8. The method of claim 4 further including providing the album pages in different template options.

9. The method of claim 4 and the service account data provides the photo product options selected by the user in step c).

10. The method of claim 4 further including providing removable album pages which are incorporated in an album binder.

11. The method of claim 10 wherein the album binder has a known capacity and the service account data indicates the number of pages remaining in the album.

12. The method of claim 4 wherein a sequential page number is printed on each album page and the service account data identifies the next available page number in the album.

13. The method of claim 1 wherein the printing option includes a plurality of size prints and border formats.

14. The method of claim 1 wherein at least one of the printing options includes a plurality of print sizes, picture frame styles, or picture frame mattes or combinations thereof.

15. A computer program product having instructions stored thereon for performing the method according to claim 1.

16. The method of claim 1 wherein the service account includes an address to which the prints are sent.

17. The method of claim 1 wherein the service account includes a payment identifier that specified the account to be charged for services.

* * * * *